March 10, 1959
H. G. WALDSCHMIDT
2,876,683
METHOD AND DEVICE FOR CONTROLLING GUIDE
MACHINES OR THE LIKE AGGREGATES
Filed Aug. 8, 1955
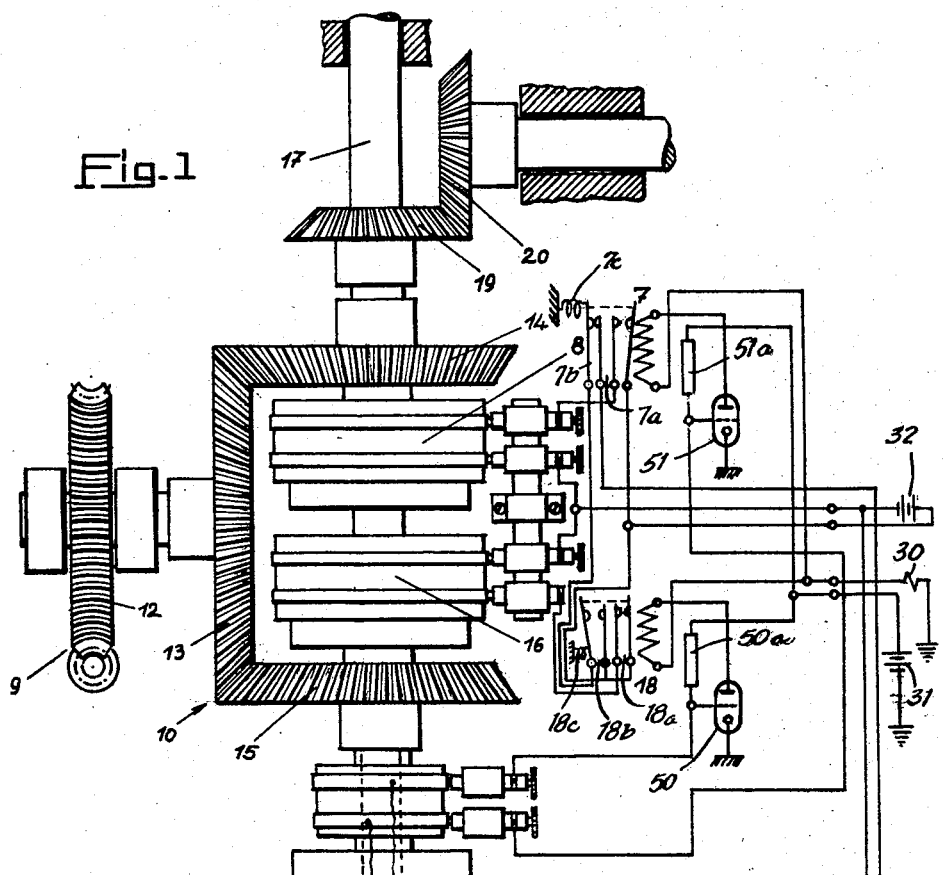
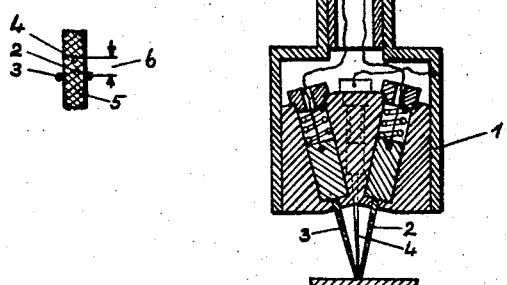
INVENTOR
HEINRICH G. WALDSCMIDT
BY Toulmin & Toulmin
ATTORNEYS

1

2,876,683
METHOD AND DEVICE FOR CONTROLLING GUIDE MACHINES OR THE LIKE AGGREGATES

Heinrich Georg Waldschmidt, Friedberg, Germany

Application August 8, 1955, Serial No. 527,110

3 Claims. (Cl. 90—62)

This invention relates to a method and a device for controlling guide machines, guide arrangements or the like aggregates by means of which e. g. machine tools, torch cutting machines, tool room machines or the like are controlled.

It is known in connection with machine tools of different kinds, especially in connection with torch cutting machines and tool room machines to control the movement of the tool or eventually of the work piece by means of photoelectric systems in such a way that the differences of the light intensity—perceived by a photoelectric cell—of a focus projected from a light source to a pattern are used for switching processes for producing the movement desired in each case, the focus being thereby lead e. g. along the line of a drawing serving as a pattern.

In the known arrangements of this kind a focus being projected on the pattern follows the shape of this pattern or its continuous line in such a way that the focus is always situated half on a bright base and half on a dark base produced by the mentioned continuous line on the pattern. In case the focus, e. g. due to a bend of the line, deviates from the above mentioned normal "half bright-half dark position," i. e. if it either shifts completely to the dark surface or to the bright surface, a switching member is actuated by the photoelectric cell in consequence of the alteration of the light intensity of the reflected focus, which switching member actuates a pilot motor which is driven according to the deviation of the focus in a desired sense of rotation in order to cause it to return to its normal "half bright-half dark position." By means of these aggregates either the movement of the tool or the movement of the work piece is synchronously controlled.

Such devices show, however, considerable disadvantages and their application in practice is therefore limited. When the focus is returned to the normal position it cannot be avoided that especially in consequence of the moment of inertia of the single parts of the arrangement, the focus firstly slightly exceeds its normal position and slides to the opposite position and is then to be returned to the normal position in the opposite direction. It will be understood that hereby pendulum oscillation occurs which may be of unpleasant consequence, especially in connection with torch cutting machines being provided with guide arrangements of this kind.

It has also been proposed to remove these disadvantages by projecting one focus each on both sides of a continuous line on a pattern which is traced by two photoelectric cells for controlling purposes. However, also by this method no satisfactory results could be achieved, as the mentioned oscillation still occurred. Furthermore the projected focus is enlarged or reduced by unevennesses of the base plate, so that switching retardations or anticipated switching occur.

In order to remove the disadvantages connected with the known and partly only proposed guide machines, guide arrangements or the like aggregates, the invention presents a different and completely new solution of the problem. According to the invention a tracer or the like being situated in a circuit of electrons is lead along a pattern provided with electricity conducting continuous lines by which switching processes are caused when the tracers deviate from the continuous line to effect their return to the line.

It is suitable to provide two tracers or the like situated in their normal position on both sides of and in contact with the continuous line whereas another tracer, being conductively connected to material of the apparatus, rests on the centre of the continuous line therefore being in contact with it.

The continuous lines consist preferably of electricity conducting ink or other suitable material. Furthermore according to the invention an electromagnetic brake is to be actuated as soon as the tracer has returned to its normal position which brake prevents any further movement of the return drive, so that undesired reciprocating movements are certainly avoided.

The device used for carrying out the process according to the invention consists preferably of a control head from which the three tracer pins protrude, the latter sliding across the pattern. The drive is effected by a continuously running motor, whereas the transmission of the rotation movement of the motor to the elements causing the movement of the control head is effected by electrically controlled couplings.

The couplings are actuated by a relay or a switch tube—thyratron—or the like which is operated in a circuit of electrons in the same manner as the tracer pins.

As soon as the control head has returned to its normal position the electromagnetic brake is actuated and prevents any further movement which would result in an overstepping of this position.

The eventual unevennesses of the underlay plate or pattern are compensated by the elastically arranged tracer.

Figures 1 and 2 of the drawings show an especially preferred embodiment of a device according to the invention.

Fig. 1 shows diagrammatically the main construction of the device.

Fig. 2 is a top view of a section of a pattern from which the mutual position of the tracers in relation to the electricity conducting continuous line is to be seen.

The rotationally arranged control head 1 is provided with two tracers 2 and 3 and a pin 4 which are arranged in such manner that the tracers 2 and 3 are in contact with the continuous line 5 at both sides, whereas the pin 4 is arranged exactly in the centre of the line 5. The pin 4 is arranged centrically in the control head 1, whereas the tracers 2 and 3 are in spaced position according to the excentricity 6 in relation to the pin 4.

The tracers are in electrical connection with the brake 11 and the couplings 8 and 16 over the relays 7 and 18. By means of these connections accelerating and braking movements are imparted to the tracers.

Referring first to the accelerating motion, the relay transmits the respective movements of the couplings 8 and 16 to the tracers provided the conditions described further below prevail. The couplings are in continuous motion in clockwise or counterclockwise direction, respectively. The continuous motion is produced by a continuously running motor and is continuously transmitted to the couplings by the gears 9 and 10, respectively.

As the motor is continuously running no time is lost by switching in and off the motor and a motion capable for being transmitted via the couplings to the tracers for correcting the course of the latter is always ready at hand.

As to the braking motion, the electro-magnetic brake 11 retards the rotating motion of the couplings, and thereby stops the movement of the tracers, if the actuating cause described further below prevails. The actuation is transmitted to the brake by the connection with the circuit as shown in the drawings, whenever the relays 7 or 18, respectively and one of the corresponding couplings are released.

If, for instance, a curved line is to be traced or reproduced at the beginning of the curvature one of the two tracers 2 or 3 will move out of contact with the line 5 owing to the normally straight feed. In order to return the tracer, e. g. the tracer 3 to the line 5 after it has lost contact with the same, a switching process is effected immediately in so far as the relay 7 responds whereby the electromagnetic coupling 8 is supplied with current.

The electromagnetic coupling is then actuated and transmits a rotation movement of the continuously running motor across the gears 9 and 10 until the control head 1 has returned the tracer 3 to the line from which it had before deviated.

As soon as the tracer 3 touches the line 5 the relay 7 and the coupling 8 release and the return movement is terminated. However the return movement is stopped by the electromagnetic brake 11 immediately when the relay 7 and the coupling 8 are released. This is achieved by a suitable interconnection of the brake 11 in the circuits. Thus, the brake prevents the tracers from oscillating and a straight course is pursued by the latter.

The operation of the whole device is effected by means of the worm wheel 12 with which the bevel wheel 13 is tightly connected. If the bevel wheel 14 rotates counterclockwise the bevel wheel 15 rotates clockwise. All component parts, the coupling 8, the coupling 16, the brake 11, the control head 1, the bevel wheel 14, and the bevel wheel 15 are mounted on the continuous shaft 17.

If the tracer 3 deviates from the line 5 the relay 7 is actuated and causes a counter clockwise rotation of the coupling 8 as the coupling 8 is fixed to the counterclockwise moving bevel wheel 14. If instead the tracer 2 deviates from the line 5, the relay 18 is actuated and causes a right hand movement of the coupling 16, as this coupling is fixed to the right hand moving bevel wheel 15. In this way always the respective tracer is returned to the line from which it had deviated. The transmission of the rotational movements to the movement of the tool or the work piece is effected by means of the bevel wheels 19 and 20 respectively.

By further way of explanation of the manner in which the disclosed device could be adapted to an actual work operation by one skilled in the art, the shaft on which gear 20 is mounted would be connected with the tool operating the work, or whatever other device was being controlled, and movements of the tool, or other device, would also be transmitted directly to the carrier for the member bearing the line 5 so that the line 5 would be moved in the proper direction relative to the control head. Such interconnections are well known in the art of tracer control mechanisms.

The electromagnetic brake 11 would consist of a part stationarily mounted and a part connected with shaft 17 and with the two parts normally disengaged from each other but becoming engaged upon energization of a coil within the electromagnetic brake, the energization of which would cause the two parts to be clamped together thus to hold the shaft against rotation. The energization of the coil of the electromagnetic brake 11 would be accomplished only when both of relays 7 and 18 were energized.

As to the electromagnetic couplings, these units would comprise a part fixed to the adjacent one of drive members 14, 15 and a part fixed to shaft 17 and which parts would be free normally to rotate relative to each other and with there being a coil pertaining to each clutch energizable for clamping the parts thereof together in driving relation.

Since energization of either of the clutches is accomplished by the energizing of the one of relays 7, 18 pertaining thereto, it will be evident that the energization of either of the electromagnetic clutches would be accomplished by deenergization and releasing of the electromagnetic brake 11.

As to the thyratron tube control circuits for the energizing coils of the relays, any competent craftsman can supply the necessary components therefor and select suitable sources of power. For example, the plate circuits of the thyratrons, which include the coils of the relays, could advantageously be supplied by a source of alternating current 30 whereby the tubes would tend to extinguish on alternate half cycles thus rendering the control of the tubes relatively simple.

In this case the grid voltage for each tube 50, 51 could be supplied from a source of direct current 31 and the grid bias resistors 50a, 51a and the circuit could be one wherein each of the tubes is normally conductive but is capable of being rendered non-conductive when a negative grid bias is impressed across the corresponding grid resistor. It will be seen that the grid circuit of the tube 50, which incorporates the battery 31 and grid resistor 50a, will be short-circuited when ever the tracer points 2 and 4 are in electrical contact with each other, and this will occur when these two tracer points are both in electrical contact with the line 5. When this condition prevails, there is no negative bias on the grid of the tube 50, so that it will conduct and thereby energize the coil of the relay 18. Conversely, when the tracer point 2 moves out of contact from the line 5, the negative bias on the tube is fully effective, and, with the tube thus biased to cut-off, i. e., being rendered non-conductive, no current will flow through the coil of the relay 18.

Similarly, when the tracer point 3 is in contact with the line 5, the tube 51 is conductive so that an energizing current flows through the coil of the relay 7, whereas when the tracer point 3 is out of contact with the line 5, the grid resistor 51a is no longer short-circuited, so that the tube 51 is rendered non-conductive.

The switches of the relays 7 and 18 may be arranged in any suitable manner to control the clutches 8, 16 and the brake 11 in response to energization and de-energization of the relay coils. One such arrangement is shown in Fig. 1 in which each of the relays 7 and 18 incorporates two switches, indicated at 7a, 7b and 18a, 18b respectively, each switch having a stationary and a movable contact arm. The switches 7a and 18a are in circuit with their respective clutches 8 and 16 and a source of electric energy 32, whereas the two switches 7b and 18b, the brake 11 and the source of electric energy 32 are all in series-circuit with each other. Furthermore, the two switches of each relay are mechanically interconnected with each other in such a manner that when the coil of the respective relay is energized, the switch in circuit with the clutch is open whereas the switch in circuit with the brake is closed, suitable spring means 7c, 18c being provided to bias the switches into opposite position when no current flows through the coil of the relay.

As set forth above, current will flow through the coils of the relays 7, 18 so long as the respective tracer points are in electrical contact with the line 5, whereas no current will flow if the respective tracer point is out of contact with the line. In Fig. 1, the switches 18a, 18b of the relay 18 are shown in the position they would occupy if the tracer point 2 were off the line 5, whereas the switches 7a, 7b of the relay 7 are shown in the position they would occupy when the tracer point 3 is on the line, and therefore in electrical contact with the tracer point 4. Thus, with the coil of the relay 18 unenergized, the spring 18c holds the switch 18b open and the switch 18a closed. This, of course, means that the brake 11 is de-energized, whereas the clutch 16 is in circuit with the source of electrical engery 32. Consequently, shaft 17 is rotated in such direction as to return the tracer point 2 to the line 5, whereupon current would commence to flow through the coil of the relay 18, thus opening the switch 18a and closing the switch 18b. This would de-energize the clutch 16 and simultaneously energize the brake 11 (the switch 7b being closed), thereby preventing further rotation of the shaft 17 under its own inertia as soon as contact between the tracer point 2 and the line 5 is reestablished. The control head 1 would now be in its new orientation, as would be the controlled device connected to the shaft carrying the gear 20, the latter having been rotated by the gear 19 during the rotation of the shaft 17.

Of course, the shaft 17 would be rotated in the opposite direction if the tracer point 3 were to move out of contact with the line 5. In any event, it will be seen that the brake 11 is energized only so long as both of the relays occupy the position of relay 7, as shown in Fig. 1, and this condition prevails so long as both of the tracer points 2 and 3 are in contact with the line 5. In this way, undesired rotation of the shaft 17 is prevented, as is oscillation of "hunting" after the above-described control effect has completed its course.

It is a special advantage of the process according to the invention that most precise work can be achieved by its use. The respective devices are easily and economically manufactured, especially in comparison with the known similar devices of known systems. Furthermore a special safety in working can be guaranteed.

What I claim is:

1. In a device for following an electrically conductive line, the combination comprising a rotatable control head, a pair of laterally spaced electrically conductive tracer points mounted in said head to engage the side edges of the line, a third electrically conductive tracer point in the control head located between and behind said laterally spaced tracer points so as to engage the line approximately at the center thereof, a shaft supporting said control head, a pair of drive members mounted on said shaft and normally freely rotatable thereon, driving means for continuously rotating said drive members in opposite direction, a pair of electrically operable couplings energizable for connecting said drive members selectively with said shaft, a pair of relay means in circuit with said couplings, respectively, relay controlling means in circuit with said tracer points for selectively actuating said relay means when one of said laterally spaced tracer points leaves the line, thereby actuating the coupling which will cause rotation of the shaft in a direction to turn the control head so that said tracer will return to the line, an electromagnetic brake for locking said shaft against rotation, and brake controlling means in circuit with said brake and associated with said relay controlling means for actuating said brake when said relay controlling means has caused both of said couplings to be de-actuated.

2. A device according to claim 1, in which said pair of laterally spaced tracer points are laterally adjustable to accommodate the device to lines of different widths.

3. A device according to claim 1, in which said drive members are in the form of beveled gears mounted on said shaft and wherein said driving means include a third beveled gear is in mesh with both of the first mentioned gears, said last mentioned beveled gear being continuously driven in rotation.

References Cited in the file of this patent
UNITED STATES PATENTS

| | | |
|---|---|---|
| 2,354,391 | McCourt | July 25, 1944 |
| 2,364,645 | Mott et al. | Dec. 12, 1944 |
| 2,588,386 | Hubbard et al. | Mar. 11, 1952 |
| 2,679,620 | Berry | May 25, 1954 |
| 2,704,012 | Trinkle | Mar. 15, 1955 |
| 2,778,280 | Trofimov | Jan. 22, 1957 |